(12) United States Patent
Sriskandha et al.

(10) Patent No.: US 10,703,859 B2
(45) Date of Patent: Jul. 7, 2020

(54) COMPOSITIONS COMPRISING UNSATURATED CRYSTALLINE POLYESTER FOR 3D PRINTING

(71) Applicant: XEROX CORPORATION, Norwalk, CT (US)

(72) Inventors: Shivanthi E. Sriskandha, Mississauga (CA); Valerie M. Farrugia, Oakville (CA); Guerino G. Sacripante, Oakville (CA); Edward G. Zwartz, Mississauga (CA)

(73) Assignee: XEROX CORPORATION, Norwalk, CT (US)

( * ) Notice: Subject to any disclaimer, the term of this patent is extended or adjusted under 35 U.S.C. 154(b) by 127 days.

(21) Appl. No.: 15/982,627

(22) Filed: May 17, 2018

(65) Prior Publication Data

US 2019/0352455 A1 Nov. 21, 2019

(51) Int. Cl.
| | | |
|---|---|---|
| C08G 63/52 | (2006.01) | |
| C08F 2/22 | (2006.01) | |
| C08F 22/02 | (2006.01) | |
| C08G 81/02 | (2006.01) | |
| B33Y 70/00 | (2020.01) | |

(52) U.S. Cl.
CPC ............. C08G 63/52 (2013.01); C08F 2/22 (2013.01); C08F 22/02 (2013.01); C08G 81/027 (2013.01); B33Y 70/00 (2014.12); *C08F 2500/17* (2013.01); *C08F 2800/10* (2013.01)

(58) Field of Classification Search
CPC ..................................................... C08G 63/52
See application file for complete search history.

(56) References Cited

U.S. PATENT DOCUMENTS

| | | | |
|---|---|---|---|
| 3,419,637 A | 12/1968 | Parker et al. | |
| 3,896,098 A * | 7/1975 | Lasher | C08G 63/52 |
| | | | 526/318 |
| 5,393,630 A | 2/1995 | Bayley et al. | |
| 5,536,613 A | 7/1996 | Chang et al. | |
| 5,800,861 A * | 9/1998 | Chiang | C09D 5/32 |
| | | | 252/587 |
| 5,972,272 A * | 10/1999 | Nagase | B29C 70/50 |
| | | | 264/320 |
| 6,110,411 A | 8/2000 | Clausen et al. | |
| 7,208,563 B2 * | 4/2007 | Shirai | C08G 63/52 |
| | | | 430/109.4 |
| 7,851,519 B2 | 12/2010 | Agur et al. | |

(Continued)

FOREIGN PATENT DOCUMENTS

| | | | |
|---|---|---|---|
| JP | 2012116882 A | 6/2012 | |
| WO | WO-2016021159 A1 * | 2/2016 | ............ C08F 283/01 |

(Continued)

OTHER PUBLICATIONS

Gonçalves, Filipa A.M.M. et al., Biofabrication, 2014, vol. 6, 035024 (Year: 2014).*

(Continued)

*Primary Examiner* — Rip A Lee
(74) *Attorney, Agent, or Firm* — Pillsbury Winthrop Shaw Pittman LLP

(57) ABSTRACT

A composition for use in 3D printing includes an unsaturated polyester resin including an ethylenically unsaturated monomer, a first diol monomer and a second diol monomer.

15 Claims, 4 Drawing Sheets

(56) References Cited

U.S. PATENT DOCUMENTS

| | | | |
|---|---|---|---|
| 8,114,334 | B2 | 2/2012 | Martinoni et al. |
| 8,460,451 | B2 | 6/2013 | Xu et al. |
| 8,834,777 | B2 | 9/2014 | Simon et al. |
| 8,981,010 | B2 | 3/2015 | Schmidt et al. |
| 9,399,699 | B1 | 7/2016 | Zhou et al. |
| 9,611,355 | B2 | 4/2017 | Martinoni et al. |
| 10,196,472 | B2 * | 2/2019 | Yamamoto ............ C08F 283/01 |
| 2009/0226748 | A1 * | 9/2009 | Brouns ................ C08F 263/00 428/514 |
| 2016/0177078 | A1 | 6/2016 | Naito et al. |
| 2019/0276593 | A1 * | 9/2019 | Farrugia ................ C08J 3/14 |

FOREIGN PATENT DOCUMENTS

| | | |
|---|---|---|
| WO | 2017/063352 A1 | 4/2017 |
| WO | 2018/015553 A1 | 1/2018 |
| WO | 2018/085245 A1 | 5/2018 |

OTHER PUBLICATIONS

Schmid, M., et al. Polymer Powders for Selective Laser Sintering (SLS). ETH-Zürich, 2014.

European Patent Office: "Extended European Search Report" re: Patent application No. 19174244.4-1107 of Xerox Corporation, dated Jul. 11, 2019, 6 pages.

Bartolo, P.J., et al.: "Stereo-thermal-litography: a new principle for rapid prototyping", Rapid Prototyping Journal, MCB University Press, Bradford, GB, vol. 9, No. 3, Jan. 1, 2003 (Jan. 1, 2003), pp. 150-156, XP002602658, ISSN: 1355-2546, DOI: 10.1108/13552540310477454.

Filipa A M M Goncalves, et al.: 3D printing of new biobased unsaturated polyesters by microstereo-thermal-lithography, Biofabrication, vol. 6, No. 3, Sep. 5, 2014 (Sep. 5, 2014), p. 035024, XP055591939, UK ISSN: 1758-5082, DOI: 10.1088/1758-5082/6/3/035024.

European Patent Office: "Extended European Search Report" re: Patent application No. 19174245.1-1107 of Xerox Corporation, dated Aug. 22, 2019, 7 pages.

Wisanrakkit, Guy and Gillham, John K., "Continuous Heating Transformation (CHT) Cure Diagram of an Aromatic Amine/Epoxy System at Constant Heating Rates", Journal of Applied Polymer Science, vol. 42, pp. 2453-2463, 11 pages.

* cited by examiner

EX 6 LATEX 1

EX 7 LATEX 2

EX 8 LATEX 3

EX 9 LATEX 3

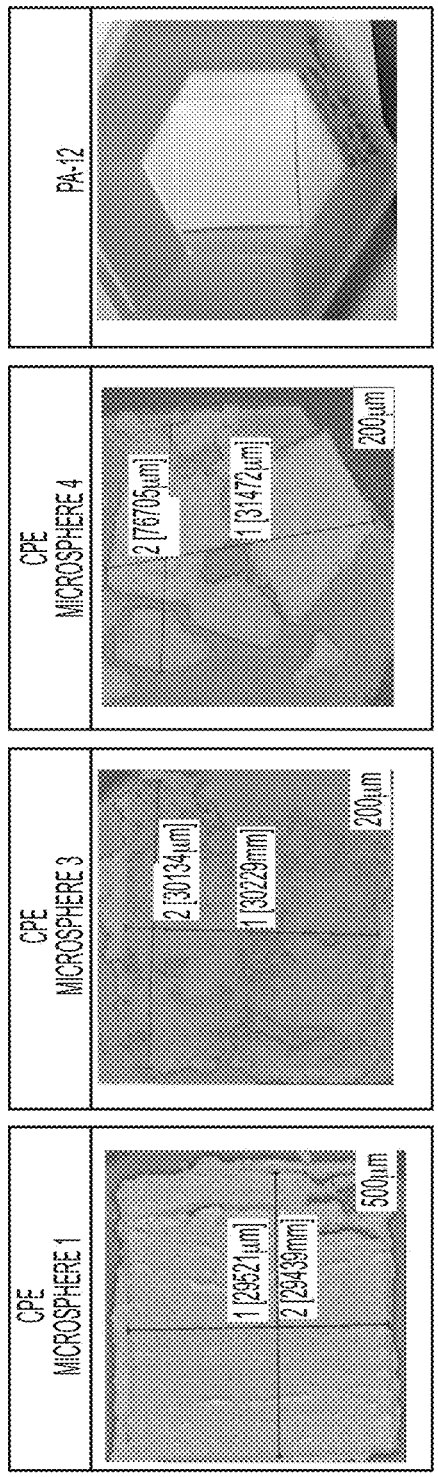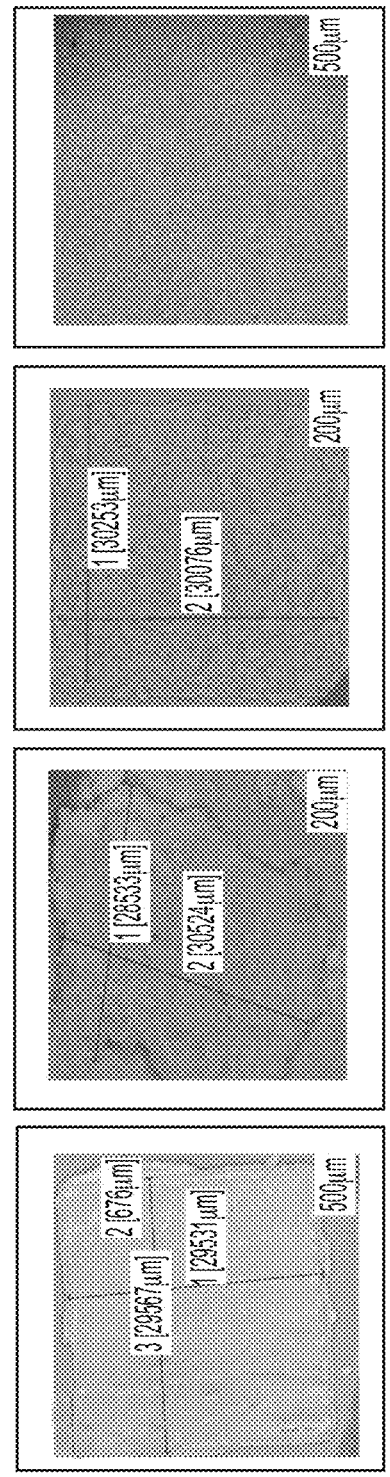

COMPOSITIONS COMPRISING UNSATURATED CRYSTALLINE POLYESTER FOR 3D PRINTING

CROSS REFERENCE TO RELATED APPLICATIONS

Reference is made to commonly owned and co-pending U.S. patent application Ser. No. 15/982,689 entitled "Curable Unsaturated Crystalline Polyester Powder And Methods Of Making The Same" to Valerie M. Farrugia, et al., electronically filed on the same day herewith, the entire disclosure of which is incorporated herein by reference in its entirety.

BACKGROUND

The present disclosure relates to three-dimensional (3D) printing. In particular, the present disclosure relates to new materials for 3D printing based on unsaturated polyester resins.

The selective laser sintering (SLS) technique for additive manufacturing (3D printing) uses a rasterized laser to "scan" over a bed of polymer powder, sintering it to form solid shapes in a layer-wise fashion. The material used for SLS is typically powdered polymers, either alone or in composite form. A selection of specifications and capabilities to meet various needs of downstream applications provides the impetus to develop new materials for 3D printing via the SLS process.

Selective Laser Sintering (SLS) 3D printing technology manufactures plastic parts by using a laser as the power source to sinter consecutive layers of polymeric powder. A problem that limits this technology from wide-ranging industrial scope is the narrow variety of applicable polymers. To date, only a few commercial polymers have been successfully applied to this technology mainly comprised of crystalline polyamides (PA), such as PA-11 or PA-12 and some limited use for other materials such as PA-6, thermoplastic polyurethanes (TPU) and polyether amides (PEBA). Amorphous resins, elastomers or other more flexible materials such as polypropylene (PP) and polyethylene (PE), and higher performance materials crucial to broadening the material properties of 3D parts cannot be used. This is due to the restricted requirement that a material must be crystalline and have a sharp melting point and re-crystallization point of approximately 30° C. to 50° C. difference in temperature.

In a SLS system, a $CO_2$ laser beam is used to selectively fuse or sinter the polymer particles deposited in a thin layer. Local full coalescence of polymer particles in the top powder layer is necessary as well as adhesion with previously sintered particles in the layers below. For crystalline or semi-crystalline polymers usually used in SLS processing, this implies that the crystallization temperature (Tc) should be inhibited during processing for as long as possible, or at least for several sintered layers. Thus, the processing temperature must be precisely controlled in-between melting (Tm) and crystallization (Tc) of the given polymer. This meta-stable thermodynamic region of undercooled polymer melt is called the 'sintering window' for a given polymer. The sintering window between onset points of Tc and Tm is from about 30° C. to 40° C. FIG. 1 demonstrates the differential scanning calorimetry (DSC) spectrum for PA-12 SLS powder. (Source: Schmid, et. al., "Polymer Powders for Selective Laser Sintering (SLS)"; ETH-Zürich, 2014.)

There is a need of more rigid or more flexible materials than the currently used polyamide (PA-6, PA-11 and PA-12). Additionally, there is a need for polymeric materials with lower temperature (Tc and Tm), such that less power requirements is needed for the 3D printer.

SUMMARY

The present disclosure provides an unsaturated polyester resin for use in three-dimensional (3D) printing comprising (1) an ethylenically unsaturated monomer having the formula I

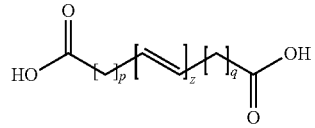

wherein each p and q is independently from 0 to 8, and z is 1 to 5; (2) a first diol monomer; and (3) a second diol monomer.

In some aspects, embodiments provide a composition comprising a cross-linked polyester resin prepared by contacting an unsaturated polyester with a thermal initiator, wherein the unsaturated polyester resin comprises (1) an ethylenically unsaturated monomer derived from maleic acid, maleic anhydride, fumaric acid, chloromaleic acid, itaconic acid, 3-hexenedioic acid, 2-heptenedioic acid, 2-octenedioic acid, glutaconic acid, 2-decenedioic acid, traumatic acid, muconic acid, mesaconic acid, citraconic acid and esters and anhydrides, and mixtures thereof; (2) a first diol monomer; and (3) a second diol monomer; wherein the thermal initiator is selected from the group consisting of ammonium persulfate, sodium persulfate, potassium persulfate, organic peroxides, 2,2'-azobis(2-methylpropanenitrile), 1,1'-azobis(cyanocyclohexane), 2-methyl 2-2'-azobis propanenitrile, 2-2'-azobis isobutyramide dehydrate 2,2'-azobis (2-methyl-N-phenylpropionamidine) dihydrochloride, 2,2'-azobis[N-(4-chlorophenyl)-2-methylpropionamidine] dihydrochloride, 2,2'-azobis[N-(4-hydroxyphenyl)-2-methyl-propionamidine]dihydrochloride, 2,2'-azobis[N-(4-amino-phenyl)-2-methylpropionamidine] tetrahydrochloride, 2,2'-azobis[2-methyl-N(phenylmethyl) propionamidine]dihydrochloride, 2,2'-azobis[2-methyl-N-2-propenylpropionamidine]dihydrochloride, 2,2'-azobis[N-(2-hydroxy-ethyl)-2-methylpropionamidine]dihydrochloride, 2,2'-azobis[2(5-methyl-2-imidazolin-2-yl)propane]dihydrochloride, 2,2'-azobis[2-(2-imidazolin-2-yl)propane]dihydrochloride, 2,2'-azobis[2-(4,5,6,7-tetrahydro-1H-1,3-diazepin-2-yl)propane]dihydrochloride, 2,2'-azobis[2-(3,4,5,6-tetrahydropyrimidin-2-yl)propane]dihydrochloride, 2,2'-azobis[2-(5-hydroxy-3,4,5,6-tetrahydropyrimidin-2-yl)propane]dihydrochloride, 2,2'-azobis {2-[1-(2-hydroxyethyl)-2-imidazolin-2-yl]propane}dihydrochloride, and mixtures thereof.

BRIEF DESCRIPTION OF DRAWINGS

Various embodiments of the present disclosure will be described herein below with reference to the figures wherein:

FIGS. 5A-F are the digital microscope images of the sintered unsaturated CPE powders according to certain embodiments of the disclosure.

FIGS. 5G-H are the digital microscope images of the commercial PA-12 powder.

DETAILED DESCRIPTION

Embodiments herein provide unsaturated polyester resins for use in selective laser sintering (SLS) 3-D printing technology.

Figure 1:
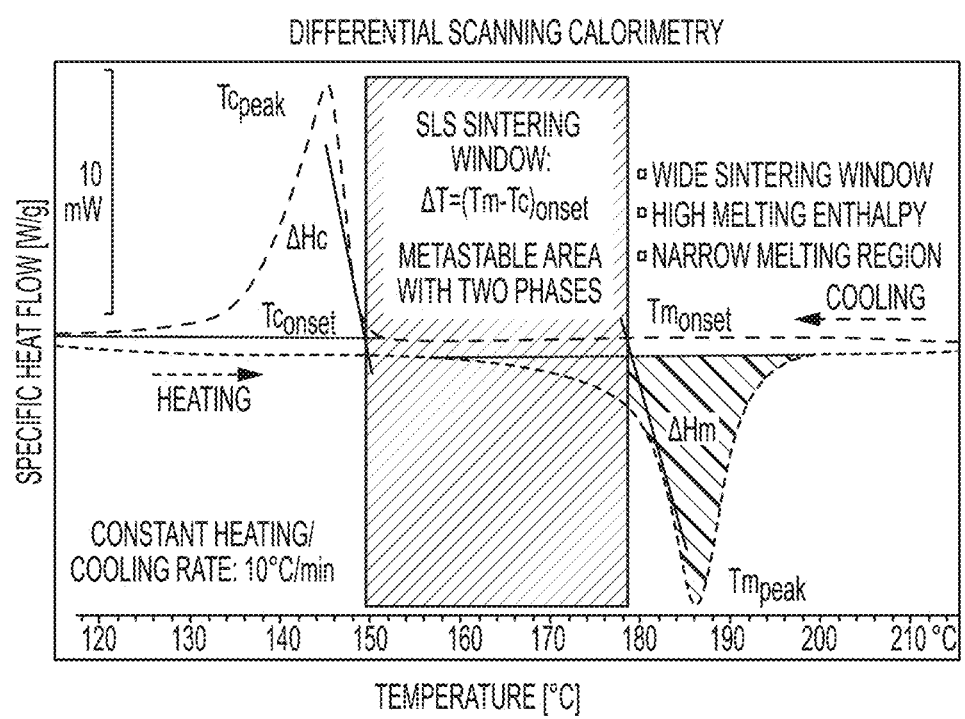
FIG. 1 shows the differential scanning calorimetry (DSC) spectrum for PA-12 SLS powder; reproduced from Schmid, M., Amado, A., Wegener, K., 30th International Conference of the Polymer Processing Society, Cleveland, Ohio, USA, Jun. 8-12, 2014.
Figure 2:
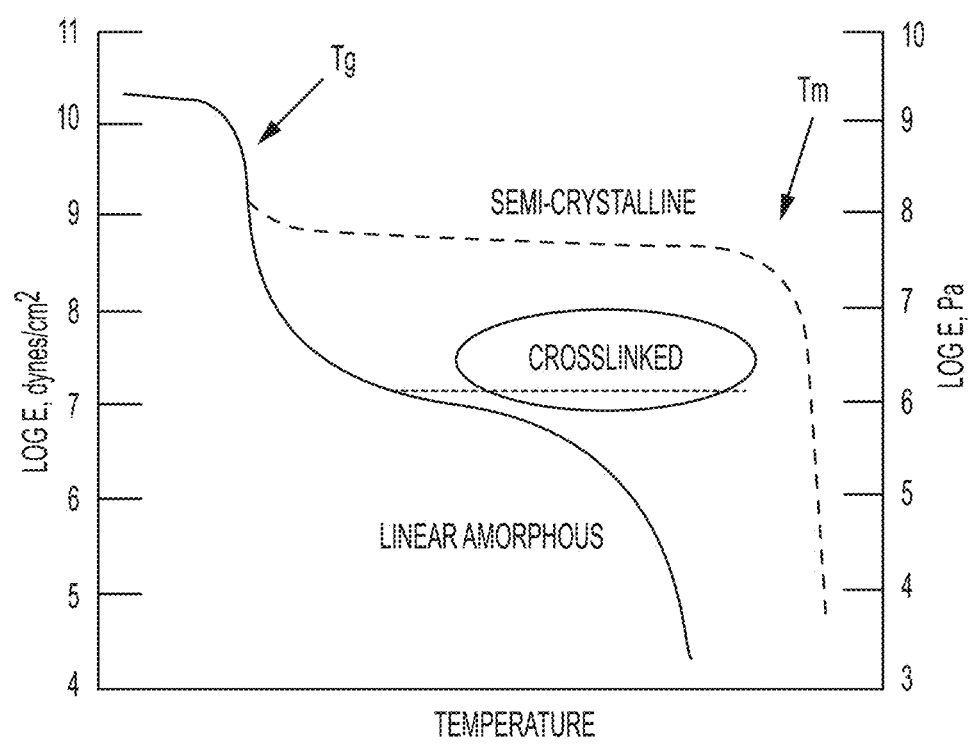
FIG. 2 shows a schematic of the Young's Modulus (E)/Temperature relationship for various types of polymers; reproduced from Wisanrakkit and Gilham, J. Appl. Poly. Sci., 42, 2453 (1991).
Figure 3:
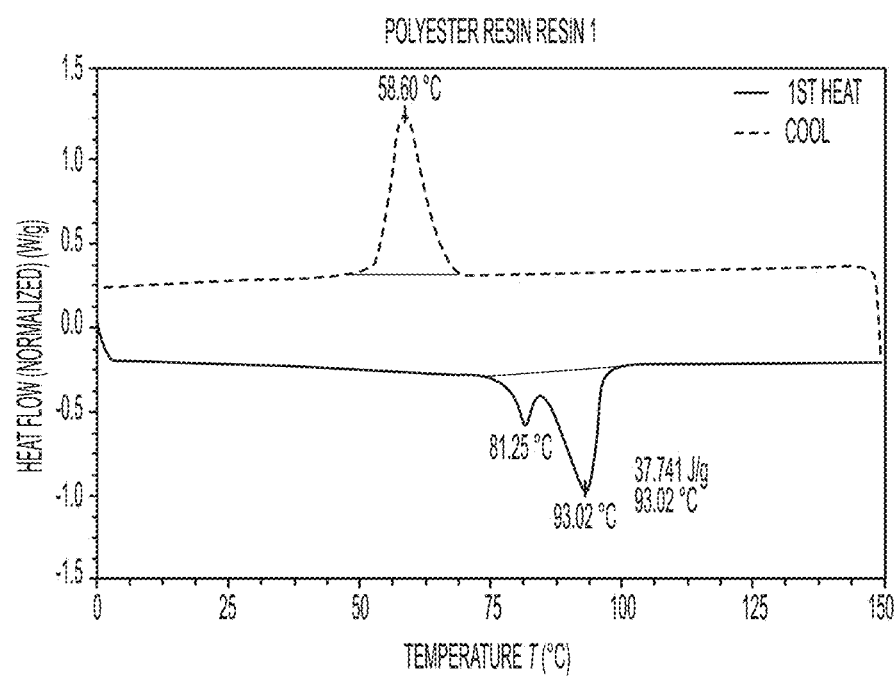
FIG. 3 shows the differential scanning calorimetry (DSC) data of Crystalline Polyester Resin 1 according to certain embodiments of the disclosure.
Figure 4A:
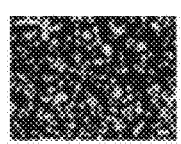
FIGS. 4A-D show the digital microscope images of Emulsion Aggregation Particles prepared from the Crystalline Polyester Resin according to certain embodiments of the disclosure.
Figure 4B:
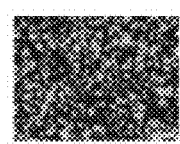
Figure 4C:
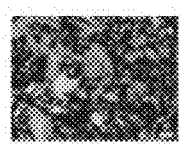
Figure 4D:
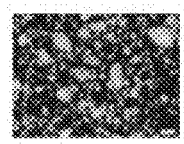

Optimal materials for SLS printing are crystalline and possess sharp melting points. The present disclosure provide unsaturated crystalline polyester (CPE) (used interchangeable with "unsaturated polyester" or "unsaturated polyester resins"), like the commercial PA-12 having a very similar DSC profile, but shifted to lower temperatures. The lower viscosity of CPE allows for printed objects with improved finishes, eliminating polishing or chemical surface treatment. The unsaturated CPE can be crosslinked with thermal initiators to form thermosetting resins. Crosslinked unsaturated CPE has greater strength and improved mechanical properties compared with its uncrosslinked counterpart. FIG. 2 shows a schematic of a typical Young's Modulus (E)/Temperature relationship for crosslinked and uncrosslinked polymers.

The unsaturated CPE of the embodiments may be derived from a diacid of Formula I (ethylenically unsaturated monomer), and at least two aliphatic diols of Formula II.

The general synthetic scheme for the preparation of the unsaturated polyester of Formula III is shown below:

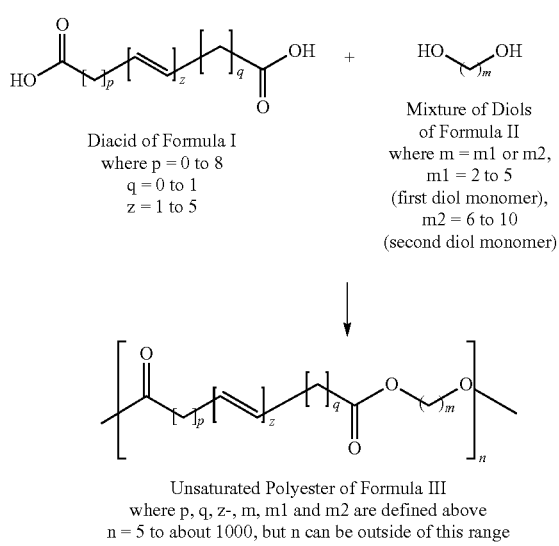

Diacid of Formula I
where p = 0 to 8
q = 0 to 1
z = 1 to 5

Mixture of Diols of Formula II
where m = m1 or m2,
m1 = 2 to 5
(first diol monomer),
m2 = 6 to 10
(second diol monomer)

Unsaturated Polyester of Formula III
where p, q, z-, m, m1 and m2 are defined above
n = 5 to about 1000, but n can be outside of this range In embodiments, the unsaturated CPE of the embodiments may be derived from fumaric acid, and at least two aliphatic diols of Formula II.

In embodiments, the unsaturated CPE of the embodiments may be derived from fumaric acid, and two aliphatic diols, such as, 1,4-butanediol (1,4-BD) and 1,6-Hexane-diol (1,6-HD). The synthetic scheme for the preparation of the unsaturated polyester from fumaric acid and 1,4-BD and 1,6-HD is shown below:

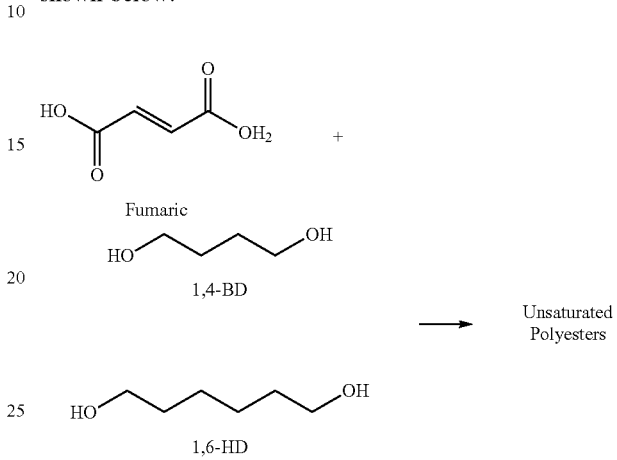

Examples of the ethylenically unsaturated monomer include, but are not limited to, maleic acid, maleic anhydride, fumaric acid, chloromaleic acid, itaconic acid, 3-hexenedioic acid, 2-heptenedioic acid, 2-octenedioic acid, glutaconic acid, 2-decenedioic acid, traumatic acid, muconic acid, mesaconic acid, citraconic acid and esters and anhydrides thereof, and mixtures thereof.

The ethylenically unsaturated monomer reacts with at least two different aliphatic diols (i.e., the first diol monomer, and the second diol monomer) to form an unsaturated polyester of Formula III.

The two aliphatic diols differ in the number of carbon atoms in the molecule, where the first diol monomer contains from 2 to 5 carbon atoms (m1=2 to 5), and the second diol monomer contains from 6 to 10 carbon atoms (m2=6 to 10). In embodiments, the first diol monomer contains from 2 to 4 carbon atoms, or 3 to 4 carbon atoms. In embodiments, the second diol monomer contains from 6 to 9 carbon atoms, or 6 to 8 carbon atoms. Examples of the aliphatic diols include, but are not limited to, 1,2-propanediol, 1,3-propanediol, 1,2-butanediol, 1,3-butanediol, 1,4-butanediol, 1,5-pentanediol, 1,6-hexanediol, 1,7-heptanediol, 1,8-octanediol, 1,9-nonanediol, 2,2-dimethylpropanediol, 2,2,3-trimethylhexanediol, 1,4-cyclohexanedimethanol, 1,3-cyclohexanedimethanol, xylenedimethanol, cyclohexanediol, diethylene glycol, bis(2-hydroxyethyl) oxide, dipropylene glycol, dibutylene glycol, 2,2-dimethylpropane-1,3-diol (neopentyl glycol), hexane-2,5-diol, hexane-1,6-diol, and the combinations thereof.

In embodiments, the carbon chain of any aliphatic diol may be optionally substituted at any carbon atom. Such optional substitution may include halogen, $C_1$-$C_4$ alkyl, $C_1$-$C_4$ alkoxy, and combinations thereof.

By varying the molar ratio of the first diol monomer (Formula II, where m1=2 to 5) and the second diol monomer (Formula II, where m2=6 to 10), and reacting these monomers with the ethylenically unsaturated monomer (Formula I), a series of unsaturated polyester resins (Formula III) with varying melting and re-crystallization temperatures can be made. The molar ratio of the first diol monomer to the second diol monomer may be from 80:20 to about 60:50, from 75:25 to 65:35, and preferably 70:30.

The higher the molar ratio of the first monomer to the second monomer, the lower the melting point of the resulting unsaturated polyester resin.

In embodiments, the unsaturated polyester resin has a crystallization temperature (Tc) of from about 50° C. to about 70° C.

In embodiments, the unsaturated polyester resin has a melting temperature (Tm) of from about 75° C. to about 110° C.

Although lower melting unsaturated polyester resins can be obtained by increasing the first monomer content, it is desired that the re-crystallization temperature of the unsaturated polyester resin is greater than 58° C. If the recrystallization temperature is less than 58° C., the toner particles will stick together when exposed to elevated temperatures and cause blocking (or cohesion). Blocking is a phenomena where toner subjected to high temperatures softens and toner particles coagulate.

It is desired that the unsaturated polyester resin is derived from at least 25 mol percent (in embodiments, at least 30 mol percent, at least 35 mol percent, at least 40 mol percent, at least 45 mol percent, or at least 50 mol percent) of ethylenically unsaturated monomer (diacid), such that the unsaturated polyester resin can be cured (crosslinked) thermally in the presence of a thermal initiator. In embodiments, the unsaturated polyester resin is derived from between 30 mol percent and 95 mol percent, between 40 mol percent and 90 mol percent, between 50 mol percent and 85 mol, between 60 mol percent and 80 mol percent, between 65 mol percent and 80 mol percent, or between 70 mol percent and 80 mol percent of ethylenically unsaturated monomer.

In embodiments, the unsaturated polyester resin is derived from between 10 mol percent and 50 mol percent, between 20 mol percent and 45 mol percent, or between 30 mol percent and 45 mol percent of the first monomer.

In embodiments, the unsaturated polyester resin is derived from between 5 mol percent and 50 mol percent, between 10 mol percent and 50 mol percent, or between 25 mol percent and 40 mol percent of the second monomer.

The viscosity of the unsaturated CPE resin at 120° C. may be from 100 to 600 Poise, or from 200 to 500 Poise. The acid value of the unsaturated CPE resin may be from 3 to 20, or from 5 to 20 KOH/g.

In embodiments, there are provided compositions for use in 3D printing comprising an unsaturated polyester resin comprising (or derived from) an ethylenically unsaturated monomer (such as furmaic acid), a first monomer (such as, 1,4-butanediol), and a second monomer (such as, 1,6-Hexane-diol). In further embodiments, the unsaturated polyester resin may be derived from between 49 mol percent and 51 mol percent of an ethylenically unsaturated monomer (such as furmaic acid), from between 25 mol percent and 45 mol percent of an a first monomer (such as, 1,4-butanediol), and from between 10 mol percent and 30 mol percent of a second monomer (such as, 1,6-Hexane-diol). In further embodiments, the unsaturated polyester resin may be derived from between 49 mol percent and 51 mol percent of an ethylenically unsaturated monomer (such as furmaic acid), from between 30 mol percent and 40 mol percent of an a first monomer (such as, 1,4-butanediol), and from between 10 mol percent and 30 mol percent of a second monomer (such as, 1,6-Hexane-diol).

The unsaturated polyester resin may be cured to form a rigid crosslinked unsaturated CPE when combined with a thermal initiator during the SLS process. The cured unsaturated polyester resin may be made via the Emulsion Aggregation (EA) process resulting in particles with spherical to potato-like morphology.

Emulsion aggregation (EA) is a bottom-up approach that "grows" particles of uniform size from sub-micron sized components. The EA process can deliver the desired size and narrow particle size distribution necessary for optimal print quality. Through the EA process, nanometer-sized particles can be manipulated and designed into micron-sized materials of various composite designs. See, U.S. Pat. Nos. 5,585,215, 5,650,256, 5,501,935, 5,418,108, which are incorporated herein by reference in their entirety. Resulting in core particles as aggregates from about 3 microns to about 100 microns in volume average diameter, or in embodiments of from about 4 microns to about 90 microns in volume average diameter, or in embodiments of from about 10 microns to about 80 microns in volume average diameter.

The unsaturated CPE particles may have a circularity of from about 0.910 to about 0.940, from about 0.950 to about 0.970, or from about 0.975 to about 0.990, measured by Sysmex FPIA 3000 Flow Particle Image Analyzer. The average particle sizes range from 5 to 120 microns, from 6 to 80 microns, or from 10 to 60 microns with narrow size distributions (both volume and number), measured by the Coulter Counter (Multisizer III). Ideally, the thermal initiator has a half-life of less than the Emulsion Aggregation coalescence temperature used during the EA process. The unsaturated polyester resin may be cured with the thermal initiator at a curing temperature of from about 20° C. to about 30° C., from about 10° C. to about 15° C. higher than the unsaturated polyester resin's melting point.

Examples of suitable thermal initiators include water soluble initiators, such as ammonium persulfate, sodium persulfate, and potassium persulfate, organic soluble initiators including organic peroxides, and azo compounds including Vazo peroxides, such as VAZO 64™, [2,2'-azobis (2-methylpropanenitrile) or 2,2'-azobis(isobutyronitrile) also known as AIBN], VAZO 88™, [1,1'-azobis(cyclohexanecarbonitrile) or 1,1'-azobis(cyanocyclohexane)], 2,2'-Azodi(2-methylbutyronitrile (Vazo™ 67 obtained from Sigma-Aldrich), and combinations thereof. Other suitable water-soluble initiators which may be used include azoamidine compounds, for example 2-methyl 2-2'-azobis propanenitrile, 2-2'-azobis isobutyramide dehydrate, 2,2'-azobis (2-methyl-N-phenylpropionamidine) dihydrochloride, 2,2'-azobis[N-(4-chlorophenyl)-2-methylpropionamidine] dihydrochloride, 2,2'-azobis[N-(4-hydroxyphenyl)-2-methyl-propionamidine]dihydrochloride, 2,2'-azobis[N-(4-amino-phenyl)-2-methylpropionamidine] tetrahydrochloride, 2,2'-azobis[2-methyl-N(phenylmethyl) propionamidine]dihydrochloride, 2,2'-azobis[2-methyl-N-2-propenylpropionamidine]dihydrochloride, 2,2'-azobis[N-(2-hydroxy-ethyl)-2-methylpropionamidine]dihydrochloride, 2,2'-azobis[2(5-methyl-2-imidazolin-2-yl)propane]dihydrochloride, 2,2'-azobis[2-(2-imidazolin-2-yl)propane]dihydrochloride, 2,2'-azobis[2-(4,5,6,7-tetrahydro-1H-1,3-diazepin-2-yl)propane]dihydrochloride, 2,2'-azobis[2-(3,4,5,6-tetrahydropyrimidin-2-yl)propane]dihydrochloride, 2,2'-azobis[2-(5-hydroxy-3,4,5,6-tetrahydropyrimidin-2-yl) propane]dihydrochloride, 2,2'-azobis {2-[1-(2-hydroxyethyl)-2-imidazolin-2-yl]propane}dihydrochloride, combinations thereof, and the like.

In embodiments, the composition consists essentially of the unsaturated polyester resin. In embodiments, the composition consists from 75% to 100%, from 80% to 100% or from 90% to 95% of the unsaturated polyester resin by weight of the composition.

In embodiments, the composition consists essentially of the unsaturated CPE resin. In embodiments, the composition consists from 75% to 100%, from 80% to 100% or from 90% to 95% of the unsaturated CPE resin by weight of the composition.

In embodiments, the unsaturated polyester resin has a yield stress in a range from about 10 megapascals to about 100 megapascals.

In embodiments, the unsaturated polyester resin has a yield strain in a range from about 1% to about 10%.

In embodiments, the unsaturated polyester resin has a Young's Modulus in a range from about 0.5 to about 5 gigapascals.

In embodiments, the unsaturated polyester resin has a breaking strain in a range from about 10% to about 100%.

In embodiments, the unsaturated polyester resin has a breaking stress in a range from about 10 megapascals to about 100 megapascals.

In embodiments, the cured unsaturated polyester resin has a yield stress in a range from about 10 megapascals to about 100 megapascals.

In embodiments, the cured unsaturated polyester resin has a yield strain in a range from about 1% to about 10%.

In embodiments, the cured unsaturated polyester resin has a Young's Modulus in a range from about 0.5 to about 5 gigapascals.

In embodiments, the cured unsaturated polyester resin has a breaking strain in a range from about 10% to about 100%.

In embodiments, the cured unsaturated polyester resin has a breaking stress in a range from about 10 megapascals to about 100 megapascals.

In embodiments, the catalyst is tin-based. Such catalysts may be based on tin (II) or tin (IV) oxidation states. In embodiments, the tin-based catalyst are mono- or dialkyl tin-based. Monoalkyl tins may further comprise oxide and/or hydroxide groups at the tin atom. In embodiments, the tin-based catalyst comprises a mixture of monobutyltin oxide, monobutyltin hydroxide oxide, and butyl stannoic acid, commercially available as FASCAT® 4100. Other tin-based catalysts employed in transesterification chemistry are well-known in the art and can be used as well to prepare the polyester resins herein, such as octabutyltetrathiocyanatostannoxane.

In embodiments, the method comprise curing the unsaturated polyester with a thermal initiator to form a mechanically robust material, where the mechanically robust material is a crosslinked unsaturated polyester. Typically, curing occurs as the 3D object is being built with the selective laser sintering (SLS).

In embodiments, the method comprise contacting the unsaturated polyester resin is performed in the absence of a solvent. In embodiments, the method comprise preparing a solvent-free phase inversion emulsion (SFPIE) latex using the unsaturated polyester resins. The latex may be prepared by dispersing the unsaturated polyester with a surfactant and a base. The latex particle size can be in a range of from about 50 to about 500 nanometers, or from about 80 to about 300 nanometers.

The choice of particular surfactants or combinations thereof, as well as the amounts of each to be used, is within the purview of those skilled in the art. Suitable surfactants include ionic or nonionic surfactants. Additionally, one or more types of surfactant may be used in the polymerization process.

Suitable anionic surfactants include sulfates and sulfonates, sodium lauryl sulfate, sodium dodecylbenzene sulfonate, sodium dodecylnaphthalene sulfate, dialkyl benzenealkyl sulfates and sulfonates, acids such as abietic acid available from Aldrich, NEOGEN R™ and NEOGEN SC™ obtained from Daiichi Kogyo Seiyaku Co., Ltd., combinations thereof, and the like. Other suitable anionic surfactants include DOWFAX™ 2A1, an alkyldiphenyloxide disulfonate from The Dow Chemical Company, and/or TAYCA POWER BN2060 from Tayca Corporation (Japan), which are branched sodium dodecyl benzene sulfonates.

Suitable cationic surfactants include ammoniums, for example, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, C12, C15, C17-trimethyl ammonium bromides, combinations thereof, and the like. Other suitable cationic surfactants include cetyl pyridinium bromide, halide salts of quaternized polyoxyethylalkylamines, dodecylbenzyl triethyl ammonium chloride, MIRAPOL and ALKAQUAT available from Alkaril Chemical Company, SANISOL (benzalkonium chloride) available from Kao Chemicals, combinations thereof, and the like. A suitable cationic surfactant includes SANISOL B-50 available from Kao Corp., which is primarily a benzyl dimethyl alkonium chloride.

Suitable nonionic surfactants include alcohols, acids, and ethers, for example, polyvinyl alcohol, polyacrylic acid, methalose, methyl cellulose, ethyl cellulose, propyl cellulose, hydroxylethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, combinations thereof, and the like. Commercially available surfactants from Rhone-Poulenc such as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™, and ANTAROX 897™ may be used.

Examples of bases include, but are not limited to, ammonium hydroxide, potassium hydroxide, sodium hydroxide, sodium carbonate, sodium bicarbonate, lithium hydroxide, potassium carbonate, triethylamine, triethanolamine, pyridine and its derivatives, diphenylamine and its derivatives, poly(ethylene amine) and its derivatives, and combinations thereof.

The crosslinked unsaturated polyester (or cured unsaturated polyester) disclosed herein may be used as a support material, which is generally removable and serves as a temporary support when making complex three-dimensional objects. Suitable support materials are well known in the art. For example, U.S. Pat. No. 8,460,451 describes a support material for an SLA (stereolithography) printer, which is incorporated herein by reference in its entirety. While the invention disclosed herein may be used for an SLA (stereolithography) printer, it is specifically designed for use with SLS (selective laser sintering) printing, which eliminates the need for additional support materials.

The support material may be delivered through the same or different print head as the polyester resin material. The support material is often delivered as a liquid and typically comprises a hydrophobic chemical material that is solid at ambient temperature and liquid at elevated application temperatures. However, unlike the polyester resin material, the support material is subsequently removed to provide the finished three-dimensional part.

Removal of the support material can be accomplished through several processes, including heating the support material to a temperature above its melting point in conjunction with the use of a suitable organic carrier to sufficiently remove the support material from the polyester resin material.

In embodiments, a method of printing a three dimensional article comprises utilizing a laser to sinter (fuse together using the heat from a high-power laser) successive layers of an unsaturated crystalline polyester, as disclosed herein, as the build material to form the three dimensional article. In embodiments, the unsaturated crystalline polyester is in microparticles form. In embodiments, the microparticles of the unsaturated crystalline polyester can be prepared by controlled aggregation of latex nanoparticles of unsaturated crystalline polyester using a flocculating agent. This process is known as emulsion aggregation. In embodiments, a method of printing a three dimensional article further comprises supporting at least one layer of the build material with a support material. Additionally, the build material and/or support material, in embodiments of methods described herein, is selectively deposited according to an image of the three dimensional article, the image being in a computer readable format.

The following Examples are being submitted to illustrate embodiments of the present disclosure. These Examples are intended to be illustrative only and are not intended to limit the scope of the present disclosure. Also, parts and percentages are by weight unless otherwise indicated. As used herein, "room temperature" refers to a temperature of from about 20° C. to about 25° C.

EXAMPLES

General Resin Synthesis

Examples 1 and 2 describe the preparation and characterization of the polyester resins in accordance with embodiments disclosed herein.

Example 1 (Crystalline Unsaturated Polyester (CPE)—Resin 1)

A 2 Liter Buchi Reactor equipped with a mechanical stirrer, distillation apparatus and bottom drain valve was charged with Fumaric acid (5.00 moles), 1,4-Butanediol (1.27 moles), and 1,6-Hexanediol (3.83 moles). The mixture was heated under nitrogen to 165° C. over a 1 hour period. Stirring was started when the batch temperature reached 120° C. The reaction temperature was then increased by 0.5° C. per minute until the batch temperature reached 191° C. Viscosity measurement was taken with a Brookfield viscometer at 120° C. (100 rpm), and then periodically sampled until the viscosity reached 315 Pa. The reaction mixture was discharged into a metal container and allowed to cool overnight to room temperature.

Example 2 (Crystalline Unsaturated Polyester (CPE)—Resin 2)

Crystalline Unsaturated Polyester (CPE) Resin 2 was prepared by the procedure of Example 1 using the conditions discussed therein except that the warm resin was left in reactor overnight and the next day latex conversion began in the same reactor (refer to Example 5 for latex synthesis procedure).

FIG. 2 shows the differential scanning calorimetry (DSC) data of Crystalline Polyester Resin 1 confirming the unsaturated polyester resin properties according to the present embodiments (the DSC data was obtained on a Q2500 Differential Scanning calorimeter (TA Instruments) at a rate of 10° C./min from 0° C. to 150° C. to 0° C.

Additional crystalline unsaturated polyester resins were prepared according to methods described above, except with that the amount of 1,6-Hexanediol (1,6-HD) and 1,4-Butanediol (1,4-BD) varies. Table 2 shows the characteristics of the unsaturated polyester resin obtained from different molar ratios of 1,4-butanediol (1,4-BD) and 1,6-Hexane-diol (1,6-HD). The variations of the viscosity and acid values in the resins shown in Table 2 are due to slight differences in the experimental set up and experimental error, and conditions in each batch (e.g., variations in equipment, heating time, reaction rates, measurement error, etc.)

TABLE 2

| Resin | 1,6-HD | 1,4-BD | Viscosity at 120° C. | Acid Value (milligrams KOH/gram) | DSC Tm ° C. | Tc ° C. | Heat of Fusion (J/g) |
|---|---|---|---|---|---|---|---|
| GS1477 | 100 | 0 | 80.1 | 11.1 | 114.8 | 85.2 | 63.07 |
| GS1478 | 50 | 50 | 388 | 11.3 | 61.8 | 10.9 | 41.7 |
| GS1480 | 80 | 20 | 339 | 8.3 | 98.3 | 66.1 | 38.9 |
| GS1485 | 75 | 25 | 221 | 3.47 | 93.8 | 58.1 | 43.8 |
| Resin 1 | 75 | 25 | 170 | 15.2 | 93.0 | 58.6 | 37.7 |
| Resin 2 | 75 | 25 | 155.3 | 13.1 | 93.3 | 58.4 | 41.4 |
| GS1498 | 75 | 25 | 188 | 13.4 | 93.6 | 61.2 | 38.6 |
| GS1499 | 75 | 25 | 141.8 | 10.7 | 93.8 | 57.0 | 44.1 |
| GS1500 | 75 | 25 | 151.5 | 8.47 | 94.4 | 59.2 | 46.5 |

Examples 3-5 describe the preparation of Unsaturated Crystalline Polyester (CPE) Latexes from Resins 1 and 2 (Examples 1 and 2). Latexes 1-3 are latex emulsion comprised of polymer particles generated from the solvent-free emulsion polymerization of unsaturated crystalline polyester.

Example 3 (Latex 1 Prepared from Resin 1)

Into a 1 L glass reactor 10.03 g TAYCA POWER BN2060 surfactant (branched sodium dodecyl benzene sulphonate), 6.93 g trimethylamine (TEA) and 200.00 g Crystalline Unsaturated Polyester Resin 1 (prepared according to Example 1) was added. The reactor was heated to 105° C. at a controlled rate. Once the resin began to melt, mixing began at a low speed (<50 RPM). At a reactor temperature of 100° C., DI water was fed into the reactor at a rate of 1.0 g/min. Gradually the mixing speed was increased to 165 RPM and then 200 RPM as the viscosity increased. As latex formed, DI water was fed into the reactor at an increased rate of 2.0 g/min, which was gradually increased to 3.0 g/min and 250 RPM. A total of 300 g of DI water was added. Full cooling was then applied and the reactor temperature was reduced to 25° C. The product was collected into a holding tank and sieved with a 25 µm screen. The particle size was then measured by Nanotrac® U2275E particle size analyzer. Narrow particle size of 72.5 nm±19.9 nm was achieved.

Example 4 (Latex 2 Prepared from Resin 1)

Example 4 was prepared by the procedure of Example 3 using the conditions discussed therein except that 10.04 g TAYCA POWER BN2060 surfactant (branched sodium dodecyl benzene sulphonate), 4.52 g trimethylamine (TEA)

and 200.00 g Crystalline Unsaturated Polyester Resin 1 (prepared according to Example 1) was added to the 1 L glass reactor. A total of 320 g of DI water was added. The particle size was then measured by Nanotrac® U2275E particle size analyzer. Narrow particle size of 171.1 nm±59.3 nm was achieved.

Example 5 (Latex 3 Prepared from Resin 2)

The resin was first synthesized by adding 479.55 g fumaric acid, 94.57 g 1,4-butanediol (BD) and 373.54 g 1,6-Hexane-diol (HD), into a 2 L Buchiglas reactor (prepared according to Example 2). The warm resin was left in the reactor overnight and the next day latex conversion began in the same reactor. To the 800 g of resin (expected yield), 40 g TAYCA POWER BN2060 surfactant (branched sodium dodecyl benzene sulphonate) and 18 g trimethylamine (TEA) was added. The reactor was heated to 115° C. at a controlled rate. Once the resin began to melt at 74° C., mixing began at a low speed. At a reactor temperature of 100.8° C., DI water was fed into the reactor at a rate of 4.0 g/min. DI water addition was stopped, restarted at a rate of 2.5 g/min, stopped again and then gradually increased from 2.0 g/min to 5.0 g/min in 0.2 g/min increments, to a final rate of 8 g/min. A total of 1200 g of DI water was added. Full cooling was then applied and the reactor temperature was reduced to 25° C. The product was then discharged and sieved with a 25 μm screen. The particle size was then measured by Nanotrac® U2275E particle size analyzer. Narrow particle size of 120.1 nm±31.5 nm was achieved.

Table 3 summarizes the amount of the reagents used in the preparation of Latexes 1-3 and the resulting latexes' particle size.

TABLE 3

| Latex ID | Resin | Tayca (pph) | TEA (pph) | D50 (nm) |
| --- | --- | --- | --- | --- |
| Latex 1 (Example 3) | Resin 1 | 3.0 | 3.4 | 72.5 |
| Latex 2 (Example 4) | Resin 1 | 3.0 | 2.2 | 171.1 |
| Latex 3 (Example 5) | Resin 2 | 3.0 | 2.25 | 125.0 |

Microparticle Formation

Example 6 (Preparation of Emulsion Aggregation (EA) Particles (CPE Microsphere 1) from Latex 1 (Example 3))

To a 2 L glass reactor 230.29 g of CPE Latex 1 from Example 3 and 456.07 g of DI water was added. Subsequently, the pH was adjusted from 6.42 to 3.04 with 53.67 g of 0.3M nitric acid and 1.44 g of ALS (aluminum sulphate) was added to the slurry under homogenization at 3000-4000 RPM. The reactor was set to 131 RPM with one P4 shaft and was heated to 66° C. to aggregate the CPE particles. Particle size was sampled regularly on a Coulter (small aperture size). The slurry was gradually decreased to pH 1.6 with 0.3 M nitric acid. When the particle size reached about 9.6 microns, particle freezing was initiated by pH adjusting the slurry with 27.08 g of 4% NaOH until pH reached 3.0. The reactor temperature was then ramped to 84° C. over 1 hour and the RPM was reduced to 90. Once at the coalescence temperature of 84° C., the slurry was coalesced for 4 hours. The slurry was then cooled to room temperature, thrice washed with DI water, isolated by centrifugation and freeze-dried. The final dry powder was submitted for moisture analysis, digital microscopy, SEM, DSC and TGA. The final particle size was 30-80 μm, measured by SEM.

Example 7 (Preparation of Emulsion Aggregation (EA) Particles (CPE Microsphere 2) from Latex 2 (Example 4))

To a 2 L glass reactor 209.39 g of CPE Latex 2 from Example 4 and 477.00 g of DI water was added. Subsequently, the pH was adjusted from 5.87 to 3.02 with 35.72 g of 0.3M nitric acid and 1.44 g of ALS (aluminum sulphate) was added to the slurry under homogenization at 3000-4000 RPM. The reactor was set to 125 RPM with one P4 shaft and was heated to 70° C. to aggregate the CPE particles. Particle size was sampled regularly on a Coulter (large aperture size). The slurry was gradually decreased to pH 1.62 with 0.3 M nitric acid. The reactor temperature was then ramped to 84° C. over 1 hour and the RPM was reduced to 80. The pH of the slurry was gradually decreased to pH 0.89 with 66.92 g 0.3 M nitric acid. The slurry was coalesced for 5 hours at 84° C. The slurry was then cooled to room temperature, thrice washed with DI water, isolated by centrifugation and freeze-dried. The final dry powder was submitted for moisture analysis and digital microscopy. The final particle size was 47-75 μm, measured by digital microscopy.

Example 8 (Preparation of EA Particles (CPE Microsphere 3) from Latex 3 Example 5

To a 2 L glass reactor 184.99 g of CPE Latex 3 from Example 5 and 431.00 g of DI water was added. Subsequently, the pH was adjusted from 5.91 to 3.00 with 40.98 g of 0.3M nitric acid and 1.44 g of ALS (aluminum sulphate) was added to the slurry under homogenization at 3000-4000 RPM. The reactor was set to 135 RPM with one P4 shaft and was heated to 70° C. to aggregate the CPE particles. Particle size was sampled regularly on a Coulter (large aperture size). The slurry was gradually decreased to pH 1.52 with 0.3 M nitric acid. The RPM was increased to 150. At a reactor temperature of 75° C. and particle size of approximately 8 microns, a 10% EP33 (19.34 g) shell was added, adjusted to pH 2.34 with 0.3 M nitric acid. When the particle size reached about 8.8 microns, the reactor temperature was ramped to 84° C. over 1 hour. At 84° C., 3.08 g of chelating agent (Versene100) was added to the reactor. The pH of the slurry was gradually decreased to pH 1.01 with 80.92 g 1 M nitric acid. The slurry was coalesced for 4 hours at 84° C. The slurry was then cooled to room temperature, thrice washed with DI water, isolated by centrifugation and freeze-dried. The final dry powder was submitted for moisture analysis and digital microscopy.

Example 9 (Preparation of EA Particles (CPE Microsphere 4) from Latex 3 (Example 5))

To a 2 L glass reactor 206.14 g of CPE Latex 3 from Example 5 and 484.00 g of DI water was added. Subsequently, the pH was adjusted from 5.88 to 3.06 with 35.01 g of 0.3M nitric acid and 1.44 g of ALS (aluminum sulphate) was added to the slurry under homogenization at 3000-4000 RPM. The reactor was set to 135 RPM with one P4 shaft and was heated to 70° C. to aggregate the CPE particles. Particle size was sampled regularly on a Coulter (large aperture size). The slurry was gradually decreased to pH 1.30 with 1 M nitric acid. The RPM was increased to 140. At a reactor temperature of 75° C. and particle size of approximately 8.3 microns, 3.08 g of chelating agent (Versene100) was added. The reactor temperature was then ramped to 84° C. over 1 hour and the RPM was reduced to 96. The pH of the slurry was gradually decreased to pH 1.12 with 46.43 g 1 M nitric acid. The slurry was coalesced for 4 hours at 84° C. The slurry was then cooled to room temperature, thrice washed with DI water, isolated by centrifugation and freeze-dried. The final dry powder was submitted for moisture analysis and digital microscopy. The final particle size was 74-115 μm, measured by digital microscopy.

Table 4 summarizes the emulsion aggregation process of preparing CPE Microspheres from the CPE Latexes. The digital microscope images of Example 6 Latex 1, Example 7 Latex 2, Example 8 Latex 3, and Example 9 Latex 3 are shown in FIGS. 4A-D respectively.

TABLE 4

|  | CPE Microsphere 1 Example 6 | CPE Microsphere 2 Example 7 | CPE Microsphere 3 Example 8 | CPE Microsphere 4 Example 9 |
| --- | --- | --- | --- | --- |
| Latex | Latex 1 | Latex 2 | Latex 3 | Latex 3 |
| ALS | | 0.5 pph | | |
| pH adjust before homogenization | | pH 3.0 | | |
| Aggregation Temperature | 66° C.-74° C. | 70° C.-84° C. | 70° C.-84° C. | 70° C.-75° C. |
| Freeze | NaOH at pH 3.0 | — | EDTA at 84° C. | EDTA at 75° C. |
| Coalescence Temperature | 84° C. for 4 hours | 84° C. for 5 hours | 84° C. for 5 hours | 84° C. for 5 hours |
| Average particle size range | 43-69 nm | 47-75 nm | n/a | 74-115 nm |

Example

SLS Printing

Dried powder materials CPE Microsphere 1, CPE Microsphere 3, CPE Microsphere 4 (Example 6, 8 and 9, respectively) were submitted for preliminary sintering tests on a Sharebot SnowWhite SLS printer ("SnowWhite"), which determined the baseline performance of the dried powders. The SnowWhite is a professional 3D printer that uses a $CO_2$ laser to sinter thermoplastic powders in a layer-by-layer fashion. The laser selectively fuses the material by scanning cross-sections of the desired object generated using a computer-aided design (CAD) model. After the first layer is scanned, the powder bed is lowered, new powder material is rolled on top, and the subsequent layer is scanned until the part is completed. The main advantage of the powder-based system compared with other additive manufacturing techniques is the elimination of printing supports and the ability to reuse materials.

The procedure for printing on the SnowWhite is as follows. A 30 mm×30 mm×0.1 mm square was printed as a preliminary screening object.
1. Blend particles with 0.5 wt % R812 silica to CPE to improve flow at 12000 RPM for 10 sec. (Note this step was only conducted for Example 6).
2. Particles were sieved through a 150 micron screen.
3. The sieved particles were applied onto an aluminum plate using a bar coater (40 mil gap/approximately 1 mm thick layer of powder).
4. The sample was placed in the SnowWhite chamber. The motors were disabled since a multilayer object was not printed. The build chamber temperature control was also disabled. The powder bed temperature was adjusted for each material to be approximately 5° C. less than the Tm. Laser rate and laser power were varied to determine optimal print conditions.
5. The chamber and powder bed were cooled to room temperature before the part was removed.

Table 5 shows the laser power and laser rate levels tested for each unsaturated CPE powder sample (Examples 6, 8 and 9) and a commercial PA-12 powder (AdSint PA12 obtained from ADVANC3D Materials® GmbH). The $CO_2$ laser is a 14 watt laser with a temperature range <190° C. This temperature refers to the temperature of the laser used in the Sharebot SnowWhite printer. No set temperature is associated with each laser power setting. Part shrinkage was measured by averaging the length and width of the printed square and dividing this value by 30 mm to determine its percent difference. For CPE Microsphere 3 and CPE Microsphere 4, the negative shrinkage value is due to unsintered powder sticking to the part. In comparison, the commercial PA-12 powder had minimal part shrinkage indicating that the CPE particles only stuck together when exposed to the laser. Print quality was measured on an arbitrary scale of 1-5, where 5 being best print quality and 1 being worst print quality.

Table 5: Summary of SLS Parameters for Sintering the EA Particles of the Unsaturated CPE Powder

TABLE 5

|  | CPE Microsphere 1 Example 6 | | CPE Microsphere 3 Example 8 | | CPE Microsphere 4 Example 9 | | PA-12 |
| --- | --- | --- | --- | --- | --- | --- | --- |
|  | a. | b. | c. | d. | e. | f. | g., h. |
| Laser power | 30% | 60% | 60% | 60% | 30% | 60% | 55% |
| Laser rate | 40 000 | 30 000 | 40 000 | 30 000 | 40 000 | 30 000 | 40 000 |
| Part shrinkage | 1.73% | 1.34% | −0.61% | 0.91% | −0.29% | −0.88% | 0.10% |
| Print quality | 3 | 3 | 1 | 2 | 2 | 2 | 5 |

Example 11

Digital microscope images of the sintered unsaturated CPE powders and a commercial PA-12 powder are shown in FIG. 5. The images labeled as a-h correspond to the Examples shown in Table 5. CPE Microsphere 1 (Example 6) powder was low density making it cohesive and difficult to level. Gaps in the surface of the sintered part were a result of the poor powder coating (FIG. 5A). At a higher laser power, the particles melted instead of sintered (FIG. 5B). CPE Microsphere 3 (Example 8) had very poor flow resulting in cohesive particles that stuck together and did not coat well. This was expected based on the rough surface of the particles observed in the optical micrographs (Table 3). CPE Microsphere 4 (Example 9) exhibits improved flow in comparison to Examples 6 and 8 of sintered unsaturated CPE powders. The sintered object of CPE Microsphere 4 is fragile and broke into pieces (FIG. 5E), or resulted in significant gaps at a higher laser powder due to uneven coating. (FIG. 5F). In comparison, the commercial PA-12 powder flowed well and sintered to form a uniform part with no gaps (FIG. 5G). FIG. 5H shows a digital microscope image of sintered PA-12, demonstrating that particles are evenly packed. These results are promising and demonstrate that EA particles of unsaturated crystalline polyester can be sintered. Although the examples printed from the inventive embodiments did not exactly match the print quality of the commercial standard (PA-12), the examples demonstrate that the composition of the present embodiments can be used to print and form objects of satisfactory quality.

Improvements in particle distribution and shape will enhance print quality.

What is claimed is:

1. A three-dimensional (3D) printing composition comprising:
an unsaturated polyester resin having a particle circularity of from about 0.910 to about 0.940 and a thermal initiator combined to form cured and crosslinked unsaturated polyester resin particles, the unsaturated polyester resin comprising
an ethylenically unsaturated monomer having the formula I

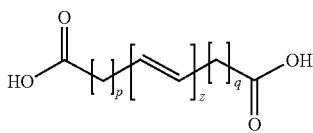

I wherein each p and q is independently from 0 to 8, and z is 1 to 5,
a first diol monomer; and
a second diol monomer, wherein the cured and cross-linked unsaturated polyester resin comprises from about 75% to about 100% by weight of the composition.

2. The composition of claim 1, wherein the ethylenically unsaturated monomer is selected from the group consisting of maleic acid, fumaric acid, 3-hexenedioic acid, 2-heptenedioic acid, 2-octenedioic acid, glutaconic acid, 2-decenedioic acid, traumatic acid, muconic acid, and mixtures thereof.

3. The composition of claim 1, wherein the ethylenically unsaturated monomer is present from about 49 to about 51 mole percent (mol %) of the unsaturated polyester resin.

4. The composition of claim 1, wherein the first diol monomer is present from about 30 to about 45 mole percent (mol %) of the unsaturated polyester resin.

5. The composition of claim 1, wherein the second diol monomer is present from about 25 to about 40 mole percent (mol %) of the unsaturated polyester resin.

6. The composition of claim 1, wherein a molar ratio of the first diol monomer to the second diol monomer is from about 80:20 to about 60:50.

7. The composition of claim 1, wherein the unsaturated polyester resin has a crystallization temperature (Tc) of from about 50° C. to about 70° C.

8. The composition of claim 1, wherein the unsaturated polyester resin has a melting temperature (Tm) of from about 75° C. to about 110° C.

9. The composition of claim 1, wherein the unsaturated polyester resin has a viscosity at 120° C. from about 200 to 600 Poise.

10. The composition of claim 1, wherein the acid value of the unsaturated polyester resin is from about 3 to 20 mg KOH/g.

11. A method of making a three-dimensional (3D) printing composition, comprising:
copolymerizing a mixture comprising an ethylenically unsaturated dicarboxylic acid, a first diol, and a second diol, thereby forming an unsaturated polyester resin, wherein the copolymerizing is conducted at a temperature in a range from about 150° C. to about 205° C.;
dispersing the unsaturated polyester resin with a solution comprising a surfactant to form a resin emulsion; and
contacting the resin emulsion with a thermal initiator to form a cross-linked polyester resin, wherein the cross-linked polyester resin comprises from about 75% to about 100% by weight of the three-dimensional (3D) printing composition.

12. The method of claim 11, wherein the contacting the unsaturated polyester resin is performed in the absence of a solvent.

13. The method of claim 11, wherein a molar ratio of the first diol to the second diol is from about 75:25 to about 65:35.

14. The method of claim 11, wherein the thermal initiator is selected from the group consisting of ammonium persulfate, sodium persulfate, potassium persulfate, organic peroxides, 2,2'-azobis(2-methylpropanenitrile), 1,1'-azobis (cyanocyclohexane), 2-methyl-2,2'-azobis propanenitrile, 2-2'-azobis isobutyramide dihydrate 2, 2'-azobis(2-methyl-N-phenylpropionamidine) dihydrochloride, 2,2'-azobis[N-(4-chlorophenyl)-2-methylpropionamidine]dihydrochloride, 2,2'-azobis[N-(4-hydroxyphenyl)-2-methylpropionamidine]dihydrochloride, 2,2'-azobis[N-(4-aminophenyl)-2-methylpropionamidine]tetrahydrochloride, 2,2'-azobis[2-methyl-N(phenylmethyl)propionamidine] dihydrochloride, 2,2'-azobis[2-methyl-N-2-propenylpropionamidine]dihydrochloride, 2,2'-azobis[N-(2-hydroxy-ethyl)-2-methylpropionamidine]dihydrochloride, 2,2'-azobis[2(5-methyl-2-imidazolin-2-yl)propane]dihydrochloride, 2,2'-azobis[2-(2-imidazolin-2-yl)propane]dihydrochloride, 2,2'-azobis[2-(4,5,6,7-tetrahydro-1H-1,3-diazepin-2-yl)propane]dihydrochloride, 2,2'-azobis[2-(3,4,5,6-tetrahydropyrimidin-2-yl)propane]dihydrochloride, 2,2'-azobis[2-(5-hydroxy-3,4,5,6-tetrahydropyrimidin-2-yl) propane]dihydrochloride, 2,2'-azobis {2-[1-(2-hydroxyethyl)-2-imidazolin-2-yl]propane}dihydrochloride, and mixtures thereof.

15. The method of claim 11 further comprising sintering the composition to build a 3D object.

* * * * *